(12) United States Patent
Sigrist

(10) Patent No.: US 11,148,884 B2
(45) Date of Patent: Oct. 19, 2021

(54) ORDER-PICKING SYSTEM AND METHOD FOR OPERATING AN ORDER-PICKING SYSTEM

(71) Applicant: FERAG AG, Hinwil (CH)

(72) Inventor: Sergio Sigrist, Hinwil (CH)

(73) Assignee: FERAG AG, Hinwil (CH)

(*) Notice: Subject to any disclaimer, the term of this patent is extended or adjusted under 35 U.S.C. 154(b) by 117 days.

(21) Appl. No.: 16/426,769

(22) Filed: May 30, 2019

(65) Prior Publication Data

US 2019/0367277 A1  Dec. 5, 2019

(30) Foreign Application Priority Data

Jun. 1, 2018 (CH) ..................................... 00698/18

(51) Int. Cl.
  *B65G 1/137* (2006.01)
(52) U.S. Cl.
  CPC .................................. *B65G 1/1376* (2013.01)
(58) Field of Classification Search
  CPC .................................................... B65G 1/1376
  See application file for complete search history.

(56) References Cited

U.S. PATENT DOCUMENTS

| 4,766,547 A * | 8/1988 | Modery | B61L 27/04 |
| | | | 700/229 |
| 5,007,521 A * | 4/1991 | Tanaka | B65G 1/1378 |
| | | | 198/347.1 |
| 10,427,873 B1 * | 10/2019 | Mause | B65G 1/1376 |
| 2003/0141165 A1 | 7/2003 | Reznik et al. | |
| 2009/0000996 A1 * | 1/2009 | Stemmle | B65G 1/0457 |
| | | | 209/584 |
| 2018/0141754 A1 | 5/2018 | Garrett et al. | |

FOREIGN PATENT DOCUMENTS

| DE | 10 2010 044 615 A1 | 3/2012 |
| EP | 0 254 261 A1 | 1/1988 |
| EP | 3 056 454 A1 | 8/2016 |
| WO | WO 95/10368 A1 | 4/1995 |
| WO | WO 2013/026173 A2 | 2/2013 |
| WO | WO 2017/192783 A1 | 11/2017 |

OTHER PUBLICATIONS

EPO, Forms 1507N; EPO 1503 03 82 and EP01703 01.91, German Communication & Extended Search Report for European Patent Application No. 19177342.3, Nov. 5, 2019 (9 pages).

* cited by examiner

*Primary Examiner* — Kyle O Logan
(74) *Attorney, Agent, or Firm* — Pauley Erickson & Swanson

(57) ABSTRACT

A method for operating an order-picking system (100) is described, comprising: providing goods gathered in batches in a batch buffer (1), batch-wise sorting of the goods in a matrix sorter (2), the goods in the order-picking system (100) being conveyed by a multiplicity of transport units which have in each case a receiving unit for receiving the goods and the transport units in the matrix sorter (2) are conveyed at least in sections by a matrix conveyor (22), wherein a control unit (7') dynamically controls the conveying speed of the matrix conveyor (22) in such a manner that the conveying speed is dependent on at least one parameter of the conveyed transport units and/or goods.

23 Claims, 4 Drawing Sheets

ORDER-PICKING SYSTEM AND METHOD FOR OPERATING AN ORDER-PICKING SYSTEM

CROSS-REFERENCE TO RELATED APPLICATIONS

Swiss Patent Applications 00698/18, filed 1 Jun. 2018, the priority documents corresponding to this invention, to which a foreign priority benefit is claimed under Title 35, United States Code, Section 119, and their entire teachings are incorporated, by reference, into this specification.

BACKGROUND OF THE INVENTION

Field of the Invention

The present invention relates to the field of intralogistics and relates to an order-picking system and a method for operating such an order-picking system.

Discussion of Related Art

In the case of order picking, goods are gathered together according to defined orders from a variety of goods, wherein various order-picking methods such as e.g. order-based or series-based order picking, serial or parallel order picking, etc. are used. As a result of the increasing number of different goods and orders, sorting processes play an important role here, with it being desirable to keep high or further increase the order-picking capacity, in particular by way of short throughput times and/or optimizing routes. The process reliability of the order picking should simultaneously be ensured.

A method for sorting individual items and a sorting system are described in WO 95/10368 A1. In the method, an identification number of an individual item is assigned a space holder number in accordance with the desired position in the flow of the individual items, and in four collection zones with in each case a specific quantity of waiting lines, a sorting is performed according to the space holder number and its components. The ejection of the individual items can then be performed in the sequence of the desired identification features. The associated system has a control apparatus which restricts the flow of items in the individual collection zones and waiting lines in the desired manner.

In order to sort the goods, in particular if the goods of an order or a multiplicity of orders should be present in a specific sequence at the dispatch station, matrix sorters can be used which sort an arbitrary sequence of transport units loaded with goods into a defined sequence. A matrix sorter normally requires a high outlay in terms of equipment if a plurality of dispatch stations have to be supplied with the order-based compilations of goods. Moreover, the order-picking capacity is typically restricted by the sorting capacity or the conveying capacity in the matrix sorter since downtimes regularly arise, among other things, as a result of the large number of switch points.

SUMMARY OF THE INVENTION

One object of the invention is therefore to provide a method for operating an order-picking system and an order-picking system which at least partially improve the prior art in terms of order-picking capacity.

This object is achieved by the features of the independent claims. Advantageous configurations of the invention are indicated in the dependent claims and in the present description and figures.

The invention relates to a method for operating an order-picking system, comprising: providing goods gathered in batches in a batch buffer, batch-wise sorting of the goods in a matrix sorter, the goods being conveyed in the order-picking system by a multiplicity of transport units which have in each case a receiving unit for receiving the goods and the transport units in the matrix sorter are conveyed at least in sections by a matrix conveyor, wherein a control unit dynamically controls the conveying speed of the matrix conveyor in such a manner that the conveying speed is dependent on at least one parameter of the conveyed transport units and/or goods.

With the compilation of the goods to form batches, requirements from several orders can be gathered in a batch-wise manner and jointly processed. A batch normally contains all the goods which belong to a specific number of orders, which goods and/or order are, however, still unsorted. For example, a batch can contain all the goods which belong to 20 specific orders, wherein each order comprises between four to five goods. The matrix sorter preferably initially sorts the orders of a batch so that the orders are present in a sorted manner e.g. in a subsequent packing station. The matrix sorter advantageously also sorts the goods within an order so that goods of an order are presented in a sorted manner at the packing station. For example, it may be advantageous to sort the goods within an order according to size, e.g. descending, in order to simplify packing in the packing station. The matrix sorter can furthermore be kept small as a result of the separation of the goods into batches and the batch-wise sorting of the goods, which reduces the outlay in terms of equipment and in particular the routes required. The batches provided in the batch buffer are generally called up by the matrix sorter and sequentially processed, i.e. one batch is preferably fully processed at least in one sorting stage before the next batch is called up.

The parameters of the transport units and/or the goods conveyed in the order-picking system generally play an important role in the configuration of an order-picking system. In particular, the parameters of the conveyed transport units and/or goods have an influence on the conveying speed of conveyors of the order-picking system and thus the order-picking capacity or the goods throughput which can be achieved. The conveying speed within the order-picking system is, however, conventionally specified once and kept constant for all the conveyors in the order-picking system so that the order-picking system normally runs far below the maximum achievable order-picking capacity. As a result of the dynamic control of the conveying speed of the matrix conveyor as a function of at least one parameter of the conveyed transport units and/or goods, the order-picking capacity, which is restricted in particular by the sorting capacity of the matrix sorter, e.g. as a result of downtimes which arise, can be optimized.

The conveying speed of the matrix conveyor can be increased as a function of a parameter of the conveyed transport units and/or goods where necessary in order to convey the goods more quickly within the matrix sorter and thus be able e.g. to balance out slow sorting processes. The conveying speed of the matrix conveyor can alternatively be reduced if specific parameters of the transport units and/or goods require a lower conveying speed of the transport units and/or goods within the matrix sorter.

In each case one good or several goods can be received in a receiving unit of a transport unit. The control unit can adjust the conveying speed of the matrix conveyor to the conveyed transport units including the goods received in the corresponding receiving units. Alternatively, the control unit can also take into account the parameters of the transport units as an offset and adjust the conveying speed to a parameter of the conveyed goods.

In one embodiment, the control unit controls the conveying speed of the matrix conveyor in such a manner that the conveying speed within a batch is in each case constant.

It is therefore advantageously sufficient for the control unit to only adjust the conveying speed of the matrix conveyor from one batch to a next batch, which reduces the control outlay. The control unit advantageously controls the conveying speed in each case as a function of a parameter of an single, representative transport unit and/or good within a batch. The control unit preferably adjusts the conveying speed to that parameter or that transport unit and/or good within a batch which has the greatest influence on the order-picking capacity.

In one embodiment, the control unit controls the conveying speed of the matrix conveyor as a function of the weight of at least one of the conveyed transport units and/or goods, wherein the conveying speed of the matrix conveyor is increased with reducing weight of the transport units and/or goods.

According to this embodiment, the parameter on which the conveying speed of the matrix conveyor is dependent is therefore the weight of the conveyed transport units and/or goods. The conveying speed of the conveyors in the order-picking system is generally adjusted to the weight of the conveyed transport units and/or goods in such a manner that the conveying speed is reduced with increasing weight of the transport units and/or goods. Since the goods with a high weight typically make up a small percentage of the entire variety of goods, the order-picking system often runs with a conveying speed which is adapted to the goods with a high weight, but does not adequately exploit the achievable order-picking capacity of the order-picking system. The order-picking capacity can therefore advantageously be optimized with the dynamic control of the conveying speed of the matrix conveyor since the conveying speed of the matrix conveyor can be increased for lighter goods or transport units with goods.

In one embodiment, the goods with a high weight, e.g. with a weight higher than a certain threshold value $m_1$, are combined in separate batches. For example, threshold value $m_1$ can be selected in such a manner that the batches with the goods with a weight>$m_1$ are those batches for which the conveying speed of the matrix conveyor should not be increased in comparison with further conveyors of the order-picking system. The combination of goods with a high weight in separate batches has the advantage that overall the number of batches with goods of high weight can be reduced and the number of batches with goods of light weight can be increased so that a higher conveying speed of the matrix conveyor can be set for a higher number of batches.

The dynamic control of the conveying speed is particularly advantageous for the batch-wise sorting of the goods since the matrix sorter sequentially processes the batches and the conveying speed can be correspondingly adjusted to the goods in a batch. As already described, the control outlay can furthermore be reduced with an adjustment of the conveying speed to a representative transport unit and/or good within a batch so that the conveying speed within a batch is in each case constant.

In one embodiment, the control unit controls the conveying speed of the matrix conveyor as a function of the weight of the heaviest transport unit and/or good of a batch.

Since the conveying speed is generally set lower with increasing weight of the conveyed goods, it can be ensured by adjustment of the conveying speed to the weight of the heaviest transport unit and/or good of a batch that the conveying speed within a batch is not too high for the requirements of the matrix sorter or the matrix conveyor.

Alternatively or additionally, the control unit controls the conveying speed of the matrix conveyor as a function of the size of at least one of the conveyed transport units and/or goods, wherein the conveying speed of the matrix conveyor is increased with reducing sizes of the transport units and/or goods.

According to this embodiment, the parameter on which the conveying speed of the matrix conveyor is dependent is therefore the size of the conveyed transport units and/or goods. The size of the transport units and/or the goods can be the extent of the transport units and/or the goods transverse to and/or along the conveying direction of the matrix conveyor.

In one embodiment, the control unit controls the conveying speed of the matrix conveyor as a function of the size of the largest transport unit and/or good of a batch.

In one embodiment, the order-picking system has, preferably in a loading station and/or in a packing station downstream of the matrix sorter, further conveyors, preferably continuous conveyors, which convey the transport units with a constant conveying speed and the control unit controls the conveying speed of the matrix conveyor in such a manner that the conveying speed of the matrix conveyor in at least one batch is higher than the constant conveying speed of the further conveyors.

The further conveyors typically serve to call up the goods from a goods store or a loading station, convey them into one or more stores and/or buffers arranged upstream of the matrix sorter and call them up again therefrom, and call up the sorted goods from the matrix sorter and convey them e.g. into a downstream packing station or dispatch station.

The conveying speed of the further conveyors is generally adapted to a specific parameter of the conveyed transport units and/or goods. For example, the conveying speed of the further conveyors can be set to the weight of the heaviest good. Since the heaviest goods normally only make up a small percentage of the overall variety of goods, the dynamic control of the conveying speed has the advantage that the conveying speed of the matrix conveyor can be adapted, preferably batch-wise, to the goods with lower weight and thus the order-picking capacity can be optimized. In particular, the reduction in order-picking capacity by the restricted sorting capacity or conveying capacity of the matrix sorter can be balanced out by an increase in the conveying speed of the matrix conveyor for lighter goods.

In one embodiment, the parameters, preferably weight and/or size, of the transport units and/or goods traveling into the matrix sorter are determined by a measuring device and transmitted to the control unit.

When determining the parameters of the transport units traveling into the matrix sorter, the measuring device generally determines the parameters of the transport units loaded with goods.

In order to determine the weight, the measuring device can comprise a weighing device. For example, the weighing device can comprise a holding device which catches hold of a transport unit with a good and weighs this transport unit.

In one embodiment, the weighing device comprises a holding device which is connected to a section of a rail and can weigh the section of the rail together with a transport unit and a good contained therein which is located on the relevant section.

In one embodiment, the weighing device comprises a platform which raises the transport unit in one direction, e.g. in the case of a transport unit conveyed in a suspended manner from bottom to top, and thus determines the weight of the transport unit with the good.

The weighing device can be arranged directly after a loading station in which the transport units are loaded with goods, which has the advantage that the control device knows the weight of the loaded transport units and the transport units can be combined immediately after loading suitably into batches which are presorted by weight.

In order to determine the size, the measuring device can comprise at least one optical sensor, e.g. light barriers, which determined the extent of the transport unit and/or the good.

In one embodiment, the transport units and/or the goods have identification elements, wherein the measuring device comprises a readout device with which the identification elements can be read out. The identification elements can comprise barcodes, QR codes, RFID tags, etc.

After reading out the identification elements, the measuring device preferably transmits the read-out identification information to the control unit. The control unit can link the identification information to a parameter determined by the measuring device, e.g. a weight or a size, of the transport unit and/or the good and adapt the conveying speed of the matrix conveyor as soon as the transport unit and/or the good with this identification information travels into the matrix sorter.

For this purpose, a further reading-out device is preferably arranged upstream of the matrix sorter, which further reading-out device reads out the identification elements of the transport units and/or goods traveling into the matrix sorter and transmits the identification information to the control unit in order to detect the travel of the corresponding transport units and/or the goods into the matrix sorter.

In one embodiment, the control unit receives the parameters, preferably weight and/or size, of the transport units and/or goods traveling into the matrix sorter from a database.

All of the goods are preferably conveyed with the same type or with a restricted number of types of transport units in the order-picking system. The weight of the transport units loaded with goods traveling into the matrix sorter can be a sum of the weight of the empty transport units and the weight of the respective goods. The parameters of the empty transport units which are also taken into account by the control unit during adjustment of the conveying speed in addition to the parameters of the goods can therefore be stored in the database. The parameters of the empty transport units can alternatively already be taken into account in the control of the conveying speed as an offset and only the parameters of the goods such as e.g. weight and/or size are stored in the database.

The transport units and/or the goods preferably have identification elements which can be read out with reading-out devices and which reading-out devices transmit the read-out identification information to the control unit which links the identification information to the parameters obtained from the database.

In one embodiment, the matrix sorter comprises a multiplicity of sorting stages, wherein the matrix conveyor leads the transport units in each case toward a sorting stage to and again away from the sorting stage.

The matrix conveyor is preferably formed as a continuous conveyor.

In one embodiment, the matrix sorter comprises a multiplicity of sorting stages and a multiplicity of matrix conveyors which are assigned in each case to a sorting stage or two sorting stages and the control unit individually controls the conveying speed of each matrix conveyor.

Optimization of the order-picking capacity within the matrix sorter can be further increased by the individual control of the conveying speed of each matrix conveyor.

If, for example, a batch with heavy goods, for which the conveying speed of the matrix conveyor is not increased, is in the last sorting stage of the matrix sorter, the conveying speed of the matrix conveyor of the first sorting stage can already be increased if the next batch traveling into the first sorting stage is composed of lighter goods, as a result of which the order-picking capacity can be further optimized.

The invention further relates to an order-picking system, comprising a batch buffer for the provision of goods compiled in batches, a matrix sorter for batch-wise sorting of the goods, a multiplicity of transport units which have in each case a receiving unit for receiving the goods, the matrix sorter comprising at least one matrix conveyor for conveying the transport units, wherein the order-picking system has a control unit which is configured to dynamically control the conveying speed of the matrix conveyor in such a manner that the conveying speed is dependent on at least one parameter of the conveyed transport units and/or goods.

In one embodiment, a transport unit comprises in each case at least one in a rail conveyable carriage, preferably suspended, and the receiving unit is connected in each case to the carriage.

In one embodiment, a transport unit comprises in each case a single carriage and a receiving unit connected to the carriage.

In one embodiment, a transport unit comprises in each case two carriages which are connected to one another and form a trolley, wherein the transport unit comprises a receiving unit which is connected to the trolley.

In one embodiment, the control unit is configured to control the conveying speed of the matrix conveyor in such a manner that the conveying speed is dependent on the number of carriages for each transport unit.

The receiving unit can comprise a pocket, a container, a hook, a bracket, a basket, a plate, etc.

The order-picking system preferably comprises rails in which the carriages can be conveyed. The matrix conveyor and/or the further conveyors preferably comprise/comprises drivable chains which comprise entrainment elements with which the carriages can be entrained along to convey the carriages.

In one embodiment, the order-picking system has, preferably in a loading station and/or in a packing station downstream of the matrix sorter, further conveyors, preferably continuous conveyors, which are configured to convey the transport units with a constant conveying speed, wherein the control unit is configured to control the conveying speed of the matrix conveyor in such a manner that the conveying speed of the matrix conveyor in at least one batch is higher than the constant conveying speed of the further conveyors.

In certain embodiments, the control unit is configured to control the conveying speed of the matrix conveyor in such a manner that conveying speed of the matrix conveyor for at least one batch is at least 30%, preferably at least 40%, particularly preferably at least 50%, higher than the constant conveying speed of the conveyors.

In one embodiment, the matrix conveyor is a continuous conveyor which is configured to guide the transport units toward a sorting stage and/or away from a sorting stage.

In one embodiment, a sorting stage of the matrix sorter has a multiplicity of buffer sections which are connected by switch points to the matrix conveyor.

The linear buffer sections are preferably connected at the input by means of an input switch point and at the output by means of an output switch point to the matrix conveyor and run in each case in a straight line, in particular in a loop-free manner, between input switch point and output switch point.

In one embodiment, the buffer sections are formed as gravitation sections with a slope in such a manner that the transport units can be conveyed by gravity in the gravitation sections.

In one embodiment, the batch buffer has a multiplicity of linear storage sections in which preferably in each case one batch or two batches can be stored.

Alternatively or in addition, three or four batches can be stored in the linear storage sections of the batch buffer.

The goods to be sorted can be divided into batches by the batch buffer. The matrix sorter can call up the batches from the batch buffer by means of the matrix conveyor and sequentially process the batches. The batch buffer also has the advantage that the routes required can be reduced. The matrix conveyor preferably connects the batch buffer to at least a first sorting stage of the matrix sorter.

In one embodiment, a store which has a multiplicity of linear storage sections is arranged upstream of the batch buffer.

The store is preferably configured to presort the goods, wherein a conveyor, preferably a continuous conveyor, is arranged between the store and the batch buffer and calls up the presorted goods from the store and supplies them to the batch buffer.

In one embodiment, the store comprises a dynamic store for the intermediate storage of the goods provided for order picking and a call-up store arranged downstream of the dynamic store for the storage of goods withdrawn from the dynamic store and thereby presorted which are arranged within a joint continuous conveyor and are connected to one another via the joint continuous conveyor.

In one embodiment, the continuous conveyor has a multiplicity of conveying sections, and the dynamic store and the call-up store are formed in each case by a multiplicity of storage sections which proceed as passes from defined conveying sections of the continuous conveyor.

In one embodiment, the store is arranged between a distributing system and the batch buffer, wherein the transport units loaded with goods in a loading station are stored in the store by the distributing system.

In one embodiment, a pack buffer which is preferably connected by the matrix conveyor to a last sorting stage of the matrix sorter is arranged downstream of the matrix sorter.

The order-picking system can comprise a multiplicity of matrix sorters, wherein a batch buffer and advantageously a store can be arranged upstream of each matrix sorter. The distributing system is advantageously formed to distribute the transport units loaded with goods to the various matrix sorters or the upstream batch buffer or store.

In one embodiment, at least one measuring device is arranged upstream of the matrix sorter, which measuring device is formed to determine the parameters, preferably the weight and/or the size, of the transport units and/or goods traveling into the matrix sorter and transmit them to the control unit.

In one embodiment, the order-picking system has a database in which the parameters, preferably the weight and/or the size, of the transport units and/or goods traveling into the matrix sorter are stored.

In one embodiment, the matrix sorter comprises a multiplicity of sorting stages and a multiplicity of matrix conveyors which are assigned in each case to a sorting stage or two sorting stages and the control unit is configured to individually control the conveying speed of each matrix conveyor.

BRIEF DESCRIPTION OF SEVERAL VIEWS OF THE DRAWINGS

Embodiments of the invention are explained in greater detail on the basis of the following figures and the associated description. In the figures.

DESCRIPTION OF PREFERRED EMBODIMENTS

In order to illustrate the invention, preferred embodiments are described in greater detail with reference to the figures.

Figure 1:
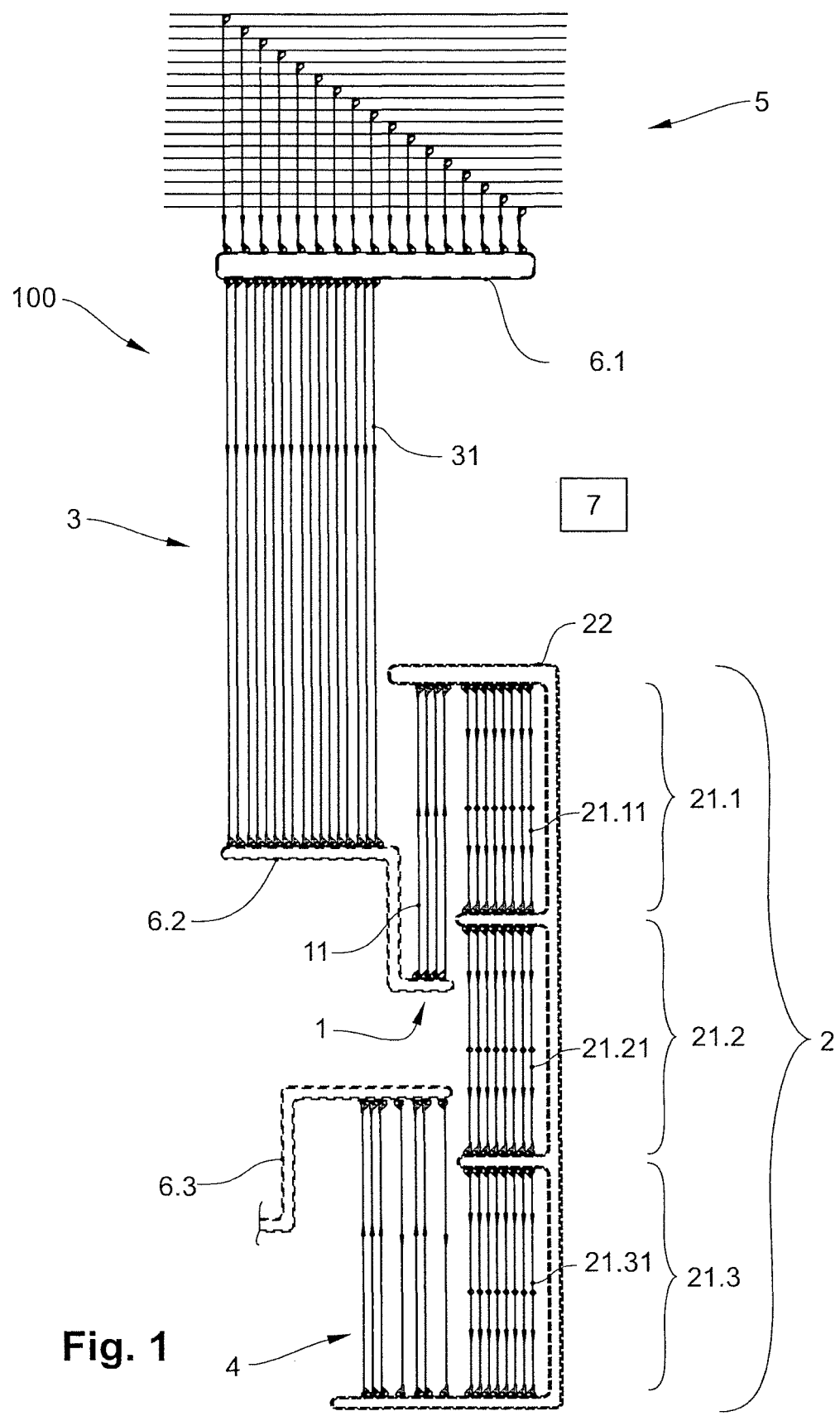
FIG. 1 shows a schematic representation of an embodiment of an order-picking system with a matrix sorter.

FIG. 1 shows a schematic representation of an embodiment of an order-picking system 100 comprising a batch buffer 1, a matrix sorter 2, a store 3 and a packing buffer 4. Store 3 is arranged upstream of batch buffer 1 and serves to store transport units loaded with goods which are distributed from distributing system 5 via continuous conveyor 6.1 to store 3. Order-picking system 100 comprises further sixteen stores, batch buffers and matrix sorters which are not shown in FIG. 1 but are supplied by distributing system 5. Store 3 comprises a multiplicity of linear storage sections 31 which are formed as gravitation sections. Batch buffer 1 comprises linear storage sections 11 in which in each case one batch or two batches can be stored. Storage sections 31 of store 3 are connected at the respective outputs by a continuous conveyor 6.2 to the inputs of storage sections 11 of batch buffer 1.

Matrix sorter 2 calls up the batches sequentially from batch buffer 1. Matrix sorter 2 is a three-stage $8^3$ sorter with three sorting stages 21.1, 21.2, 21.3 which are connected by a matrix conveyor 22 formed as a continuous conveyor. Sorting stages 21.1, 21.2, 21.3 have in each case eight linear buffer sections 21.11, 21.21, 21.31. Buffer sections 21.11, 21.21, 21.31 are formed as gravitation sections. Matrix conveyor 22 further connects the outputs of storage sections 11 of batch buffer 1 to sorting stages 21.1, 21.2, 21.3, in particular to first sorting stage 21.1, and guides the transport units loaded with goods in each case to a sorting stage 21.1, 21.2, 21.3 and once again away from respective sorting stage 21.1, 21.2, 21.3.

Matrix conveyor 22 further connects matrix sorter 2 to packing buffer 4 so that the sorted goods or the transport units loaded with goods can be supplied from matrix sorter 2 to packing buffer 4. A further continuous conveyor 6.3 guides the sorted goods or the transport units loaded with goods away from packing buffer 4.

A superordinate control unit 7 dynamically controls the conveying speed of matrix conveyor 22 in such a manner that the conveying speed is dependent on the weight of the conveyed loaded transport units of a batch. In this case, control unit 7 controls the conveying speed of matrix conveyor 22 in such a manner that the conveying speed within a batch is constant, i.e. the conveying speed is only adjusted from batch to batch.

For example, a total order can have the following appearance: 70% of the transport units loaded with goods of the total order have a mass of <2.5 kg. The transport units loaded with the heaviest goods have a mass of 9 kg. Continuous conveyors 6.1, 6.2, 6.3 are set in adaptation to the heaviest mass of 9 kg to a conveying speed of 0.5 m/s and an order-picking capacity or throughput of 4200 transport units/h. A net throughput of 4200 transport units/h effectively results for continuous conveyors 6.1, 6.2, 6.3 from a setting to a throughput of 4200 transport units/h, i.e. there is no reduction in order-picking capacity. A reduction to a net throughput of 3200 transport units /h, which leads to a restriction in the overall order-picking capacity, however, arises for matrix sorter 2 in the case of this setting. In the case of batches with loaded transport units with a mass of <2.5 kg, control unit 7 therefore sets the conveying speed of matrix conveyor 22 to 0.75 m/s and the throughput to 6300 transport units /h, which produces a net throughput of 4200 transport units/h for the matrix sorter. A uniform net throughput over entire order-picking system 100 can thus be achieved for a majority of the goods as a result of the dynamic control of the conveying speed of matrix conveyor 22. As soon as a batch with at least one loaded transport unit with a mass of >2.5 kg is pending, control unit 7 resets the conveying speed to 0.5 m/s until the batch is processed and has retracted in packing buffer 4. Control unit 7 can subsequently increase the conveying speed again to 0.75 m/s until once again a batch with at least one loaded transport unit with a mass of >2.5 kg is pending. In this manner, a dynamic sorter can be formed from matrix sorter 2.

Figure 2:
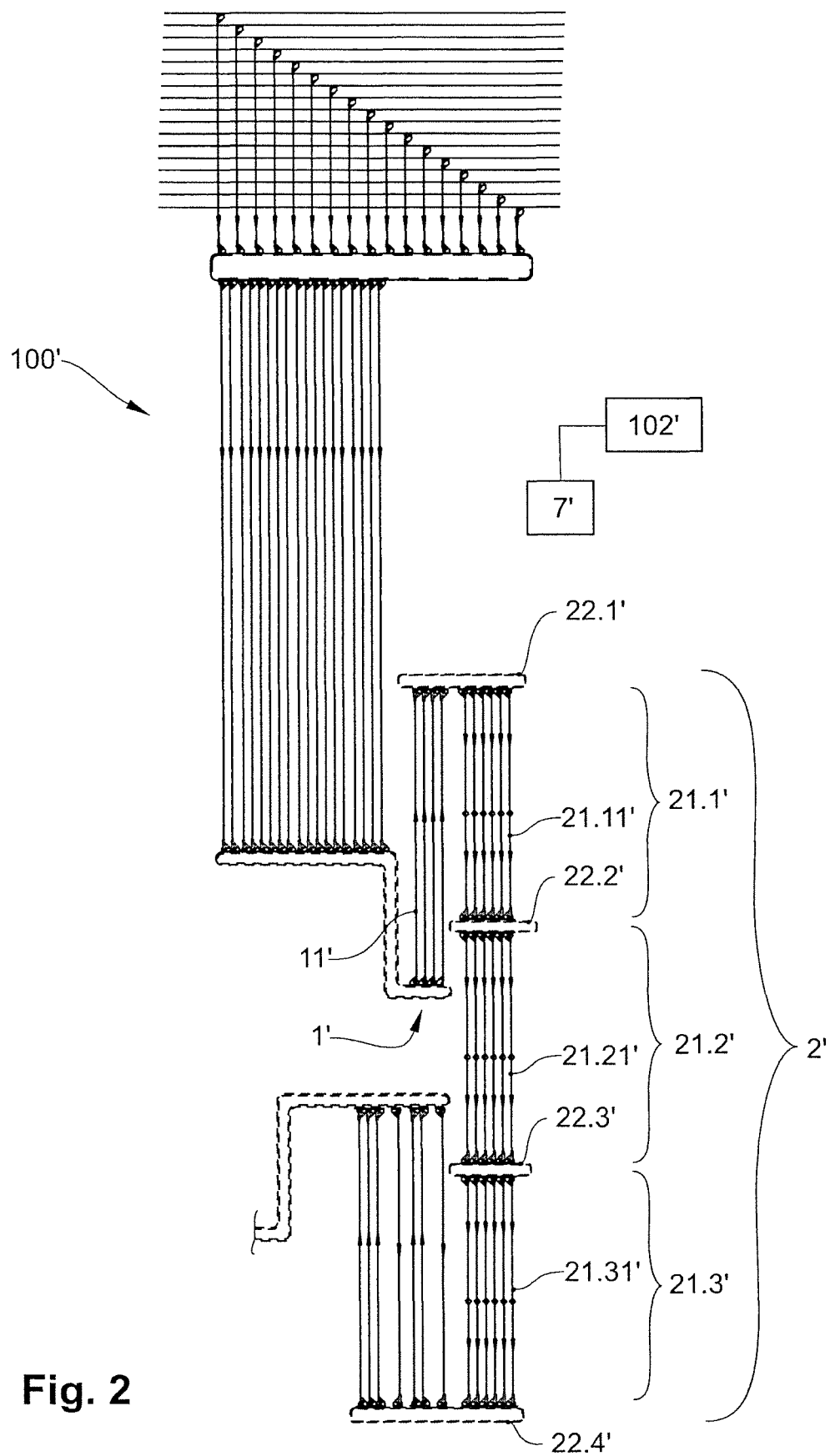
FIG. 2 shows a schematic representation of a further embodiment of an order-picking system with a matrix sorter.

FIG. 2 shows a schematic representation of a further embodiment of an order-picking system 100' with a matrix sorter 2' which is formed as a three-stage $6^3$ sorter with three sorting stages 21.1', 21.2', 21.3'. Matrix sorter 2' has four matrix conveyors 22.1', 22.2', 22.3', 22.4'. First matrix conveyor 22.1' is assigned to first sorting stage 21.1' and connects the outputs of storage sections 11' of batch buffer 1' to first sorting stage 21.1'. Second matrix conveyor 22.2' is assigned to first sorting stage 21.1' and second sorting stage 21.2' and connects the outputs of buffer sections 21.11' of first sorting stage 21.1' to the inputs of buffer sections 21.21' of second sorting stage 21.2'. Third matrix conveyor 22.3' is assigned to second sorting stage 21.2' and third sorting stage 21.3' and connects the outputs of buffer sections 21.21' of second sorting stage 21.2' to the inputs of buffer sections 21.31' of third sorting stage 21.3'. Fourth matrix conveyor 22.4' finally connects the outputs of buffer sections 21.31' to packing buffer 4'.

Control unit 7' controls the conveying speeds of each matrix conveyor 22.1'-22.4' individually. For example, as a result of the larger number of simultaneously involved switch points during the sorting process, control unit 7' can set the conveying speeds of inner matrix conveyors 22.2' and 22.3' to be lower than the conveying speeds of outer matrix conveyors 22.1' and 22.4' in order to reduce susceptibility to errors. In a further example, control unit 7' can set first and second matrix conveyor 22.1' and 22.2' with a higher conveying speed than the conveying speed of the third and fourth matrix conveyor 22.3' and 22.4' if a batch with heavy goods is located in third sorting stage 21.3' and a next batch with light goods travels into first sorting stage 21.1'.

A database 102' from which the control unit obtains the weight values of the transport units traveling into matrix sorter 2' is connected to control unit 7'. A reading-out device (not shown in FIG. 2) is furthermore arranged upstream of matrix sorter 2', which reading-out device identifies by means of identification elements fitted on the transport units the transport units traveling into matrix sorter 2' and links them to the weight values obtained from database 102'.

Figure 3:
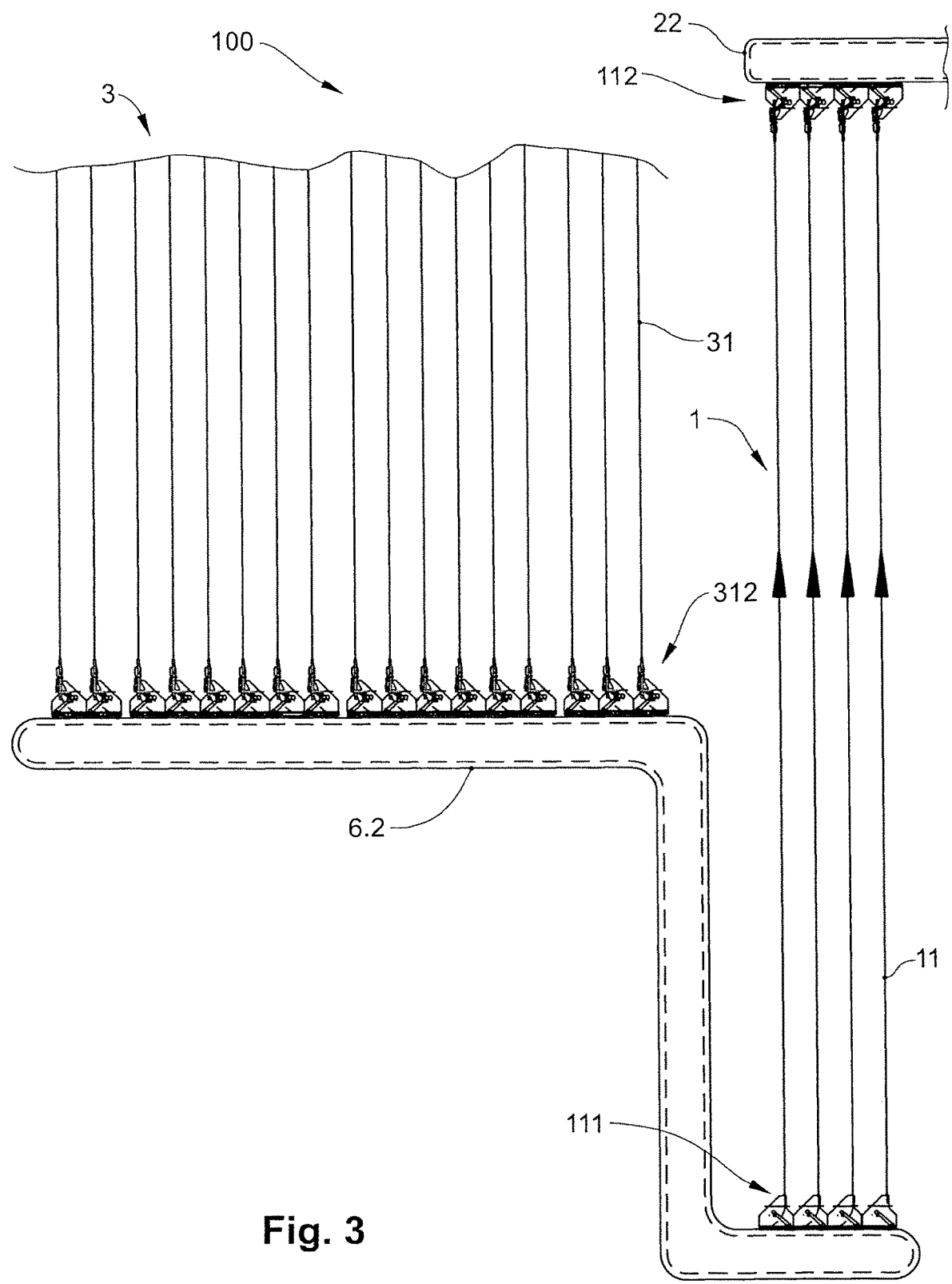
FIG. 3 shows an enlarged view of a cut-out of the order-picking system from FIG. 1.

FIG. 3 shows an enlarged view of a cut-out of order-picking system 100 from FIG. 1. Output switch points 312 via which storage sections 31 are connected to continuous conveyor 6.2 are arranged at the outputs of storage sections 31 of store 3. Input switch points 111 via which continuous conveyor 6.2 is connected to storage sections 11 are arranged at the inputs of storage sections 11 of batch buffer 1. Output switch points 112 via which storage sections 11 are connected to matrix conveyor 22 are arranged at the outputs of storage sections 11 of batch buffer 1.

Figure 4:
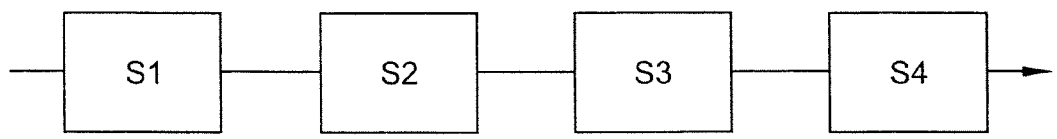
FIG. 4 shows a flow chart of an embodiment of a method for operating an order-picking system.

FIG. 4 shows a flow chart of steps of an embodiment of a method for operating an order-picking system. In step S1, the goods are loaded into transport units in a loading station. In step S2, the transport units loaded with the goods are weighed in a weighing device and identified by means of a reading-out device. The information obtained in the weighing device is transmitted to a superordinate control unit. In step S3, the weighed and identified transport units are supplied to a batch buffer by means of a distribution system and via a store. In step S4, the transport units are called up in a batch-wise manner from batch buffer and sorted in a matrix sorter.

Figure 5:
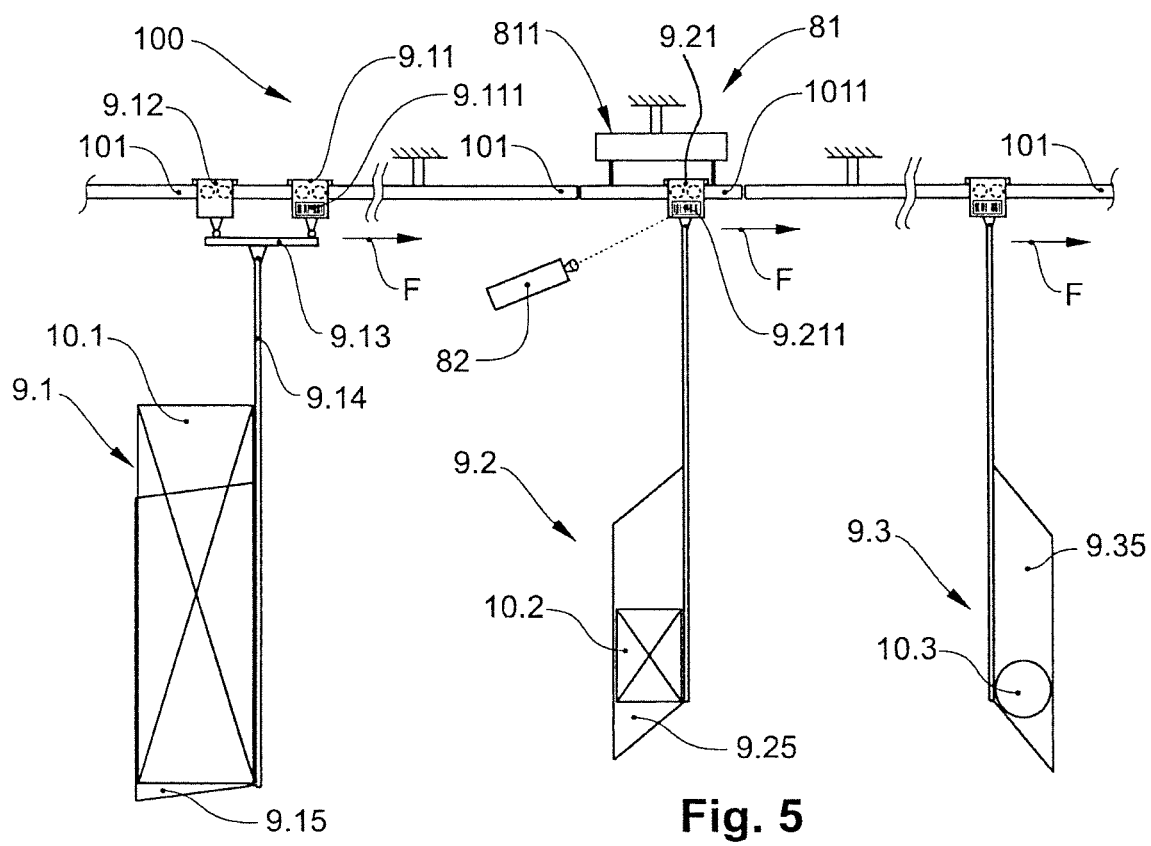
FIG. 5 shows a cut-out of an embodiment of an order-picking system with a weighing device as well as embodiments of transport units.

FIG. 5 shows a cut-out of one embodiment of an order-picking system 100 with a weighing device 81 as well as embodiments of transport units 9.1, 9.2, 9.3. Weighing device 81 can be arranged e.g. upstream of store 3 in FIG. 1, e.g. in continuous conveyor 6.1. Order-picking system 100 has a rail 101 on which transport units 9.1-9.3 can be conveyed in a suspended manner. For this purpose, transport unit 9.1 has two carriages 9.11, 9.12 which are connected via a bar 9.13 to a trolley. A receiving unit 9.15 in which a good 10.1 is received is connected to bar 9.13 via a frame 9.14. The conveying direction is shown by means of arrow F. An identification element in the form of a barcode 9.111 by means of which transport unit 9.1 can be identified is arranged on front carriage 9.11.

Weighing device 81 comprises a rail piece 1011 which is formed separately from rail 101. Rail piece 1011 is connected to a holding device 811 which weighs rail piece 1011 together with transport unit 9.2. Transport unit 9.2 has a carriage 9.21 which is located on rail piece 1011 in the configuration shown for weighing. Weighing device 81 transmits the determined weight to a control unit. A barcode 9.211 which can be read out with a reading-out device 82 is furthermore arranged on carriage 9.21. Reading-out device 82 transmits the read-out identification to the control unit. The control unit can control the conveying speed of the matrix conveyor using the determined weight and identification of the loaded transport units.

Transport unit 9.2 further comprises a receiving unit 9.25 in which a good 10.2 is received. After weighing transport unit 9.2 in rail piece 1011, carriage 9.21 travels back out of rail piece 1011 in the direction of conveying direction F.

A further embodiment of a transport unit 9.3 with a receiving unit 9.35 in which a spherical good 10.3 is received is furthermore shown in FIG. 5. In contrast to transport units 9.1 and 9.2, in the case of which receiving units 9.15, 9.25 are oriented against conveying direction F, receiving unit 9.35 is oriented toward conveying direction F.

It is furthermore apparent in FIG. 5 that loaded transport units 9.1-9.3 have a different extent in conveying direction F depending on the size of good 10.1-10.3. In certain embodiments, the extent of loaded transport units 9.1-9.3 can be determined and transmitted to the control unit by means of an optical sensor (comprising e.g. light barriers), not shown in FIG. 5. The control unit can then adapt the conveying speed of the matrix conveyor to the extent of the loaded transport units, wherein the conveying speed generally reduces with increasing extent of the loaded transport units.

What is claimed:

1. A method for operating an order-picking system (100, 100'), comprising:
    conveying goods (10.1-10.3) in the order-picking system (100, 100') by a multiplicity of transport units (9.1-9.3), each including a receiving unit (9.15, 9.25, 9.35) for receiving one of the goods (10.1-10.3),
    gathering batches of the goods (10.1-10.3) in a batch buffer (1, 1'),
    batch-wise sorting of the goods (10.1-10.3) in a matrix sorter (2, 2'),
    conveying the transport units (9.1-9.3) in the matrix sorter (2, 2') at least in sections by a matrix conveyor (22, 22.1'-22.4'), and
    a control unit (7, 7') dynamically controlling a conveying speed of the matrix conveyor (22, 22.1'-22.4') so that the conveying speed is dependent on at least one parameter of the conveyed transport units (9.1-9.3) and/or goods (10.1-10.3) in each of the batches.

2. The method as claimed in claim 1, wherein the control unit (7, 7') controls the conveying speed of the matrix conveyor (22, 22.1'-22.4') so that the conveying speed within a batch is in each case constant.

3. The method as claimed in claim 1, wherein the control unit (7, 7') controls the conveying speed of the matrix conveyor (22, 22.1'-22.4') as a function of a weight of at least one of the conveyed transport units (9.1-9.3) and/or goods (10.1-10.3), the conveying speed of the matrix conveyor (22, 22.1'-22.4') being increased with reducing weight of the transport units (9.1-9.3) and/or goods (10.1-10.3).

4. The method as claimed in claim 3, wherein the control unit (7, 7') controls the conveying speed of the matrix conveyor (22, 22.1'-22.4') as a function of the weight of a heaviest transport unit (9.1-9.3) and/or good (10.1-10.3) of a batch.

5. The method as claimed in claim 1, wherein the control unit (7, 7') controls the conveying speed of the matrix conveyor (22, 22.1'-22.4') as a function of the size of at least one of the conveyed transport units (9.1-9.3) and/or goods (10.1-10.3), the conveying speed of the matrix conveyor (22, 22.1'-22.4') being increased with reducing size of the transport units (9.1-9.3) and/or goods (10.1-10.3).

6. The method as claimed in claim 5, wherein the control unit (7, 7') controls the conveying speed of the matrix conveyor (22, 22.1'-22.4') as a function of a size of the largest transport unit (9.1-9.3) and/or good (10.1-10.3) of a batch.

7. The method as claimed in claim 1, wherein the order-picking system (100, 100') includes in a loading station and/or in a packing station downstream of the matrix sorter (2, 2'), further conveyors (6.1-6.3) which convey the transport units (9.1-9.3) with a constant conveying speed and the control unit (7, 7') controls the conveying speed of the matrix conveyor (22, 22.1'-22.4') in such a manner that the conveying speed of the matrix conveyor (22, 22.1'-22.4') in at least one batch is higher than the constant conveying speed of the further conveyors (6.1-6.3).

8. The method as claimed in claim 1, wherein parameters, including weight and/or size, of the transport units (9.1-9.3) and/or goods (10.1-10.3) traveling into the matrix sorter (2, 2') are determined by a measuring device (81, 82) and transmitted to the control unit (7, 7').

9. The method as claimed in claim 1, wherein the control unit (7') receives parameters, including weight and/or size, of the transport units and/or goods traveling into the matrix sorter (2') from a database (102').

10. The method as claimed in claim 1, wherein the matrix sorter (2) comprises a multiplicity of sorting stages (21.1-21.3), the matrix conveyor (22) guiding the transport units (9.1-9.3) in each case toward one sorting stage (21.1-21.3) and again away from the sorting stage (21.1-21.3).

11. The method as claimed in claim 1, wherein the matrix sorter (2') comprises a multiplicity of sorting stages (21.1'-21.3') and a multiplicity of matrix conveyors (22.1'-22.4') which are assigned in each case to a sorting stage (21.1'-21.3') or two sorting stages (21.1'-21.3') and the control unit (7') individually controls the conveying speed of each matrix conveyor (22.1'-22.4').

12. The method as claimed in claim 1, wherein the control unit (7, 7') controls the conveying speed of the matrix conveyor (22, 22.1'-22.4') as a function of at least one of: a weight of a heaviest transport unit (9.1-9.3) and/or good (10.1-10.3) of a batch; or a size of a largest transport unit (9.1-9.3) and/or good (10.1-10.3) of a batch.

13. An order-picking system (100, 100'), comprising:
    a batch buffer (1, 1') for the provision of goods (10.1-10.3) gathered in batches,
    a multiplicity of transport units (9.1-9.3) which have in each case each including a receiving unit (9.15, 9.25, 9.35) for receiving the goods (10.1-10.3),
    a matrix sorter (2, 2') configured to batch-wise sort the goods (10.1-10.3), the matrix sorter (2, 2') comprising at least one matrix conveyor (22, 22.1'-22.4') for conveying the transport units (9.1-9.3), and
    a control unit (7, 7') which is configured to dynamically control the conveying speed of the matrix conveyor (22, 22.1'-22.4') in such a manner that the conveying speed is dependent on at least one parameter of the conveyed transport units (9.1-9.3) and/or goods (10.1-10.3) of each of the batches.

14. The order-picking system (100, 100') as claimed in claim 13, wherein a transport unit (9.1-9.3) comprises in each case at least one in a rail (101) conveyable carriage (9.11, 9.12, 9.21), suspended, and the receiving unit (9.15, 9.25, 9.35) is connected in each case to the carriage (9.11, 9.12, 9.21).

15. The order-picking system (100, 100') as claimed in claim 13, wherein the order-picking system (100, 100') includes in a loading station and/or in a packing station downstream of the matrix sorter (2, 2'), further conveyors (6.1-6.3) of a continuous nature which are configured to convey the transport units (9.1-9.3) with a constant conveying speed, the control unit (7, 7') being configured to control the conveying speed of the matrix conveyor (22, 22.1'-22.4')

in such a manner that the conveying speed of the matrix conveyor (22, 22.1'-22.4') in at least one batch is higher than the constant conveying speed of the further conveyors (6.1-6.3).

16. The order-picking system (100, 100') as claimed in claim 13, wherein the matrix conveyor (22, 22.1'-22.4') is a continuous conveyor which is configured to guide the transport units (9.1-9.3) toward a sorting stage (21.1-21.3, 21.1'-21.3') and again away from a sorting stage (21.1-21.3, 21.1'-21.3').

17. The order-picking system (100, 100') as claimed in claim 13, wherein a sorting stage (21.1-21.3, 21.1'-21.3') of the matrix sorter (2, 2') includes a multiplicity of linear buffer sections (21.11, 21.21, 21.31, 21.11', 21.21', 21.31') which are connected by switch points to the matrix conveyor (22, 22.1'-22.4').

18. The order-picking system (100, 100') as claimed in claim 17, wherein the buffer sections (21.11, 21.21, 21.31, 21.11', 21.21', 21.31') are formed as gravitation sections with a slope in so that the transport units (9.1-9.3) can be conveyed by gravity in the gravitation sections.

19. The order-picking system (100, 100') as claimed in claim 13, wherein the batch buffer (1, 1') has a multiplicity of linear storage sections (11, 11') in which preferably in each case one batch or two batches can be stored.

20. The order-picking system (100, 100') as claimed in claim 13, wherein a store (3) is arranged upstream of the batch buffer (1, 1'), which store (3) has a multiplicity of linear storage sections (31).

21. The order-picking system (100, 100') as claimed in claim 13, wherein at least one measuring device (81, 82) is arranged upstream of the matrix sorter (2, 2'), which measuring device (81, 82) is formed to determine the parameters, preferably the weight and/or the size, of the transport units (9.1-9.3) and/or goods (10.1-10.3) traveling into the matrix sorter (2, 2') and transmit them to the control unit (7, 7').

22. The order-picking system (100, 100') as claimed in claim 13, wherein the order-picking system (100') includes a database (102') in which the parameters, preferably the weight and/or the size, of the transport units (9.1-9.3) and/or goods (10.1-10.3) traveling into the matrix sorter (2, 2') are stored.

23. The order-picking system (100, 100') as claimed in claim 13, wherein the matrix sorter (2') comprises a multiplicity of sorting stages (21.1'-21.3') and a multiplicity of matrix conveyors (22.1'-22.4') which are assigned in each case to a sorting stage (21.1'-21.3') or two sorting stages (21.1'-21.3') and the control unit (7') is configured to individually control the conveying speed of each matrix conveyor (22.1'-22.4').

* * * * *